(12) United States Patent
Usui et al.

(10) Patent No.: US 6,896,143 B2
(45) Date of Patent: May 24, 2005

(54) ELECTROLYTIC MACHINING METHOD, METHOD FOR MANUFACTURING DYNAMIC PRESSURE BEARING DEVICES, AND DYNAMIC PRESSURE BEARING DEVICES MANUFACTURED ACCORDING TO THE MANUFACTURING METHOD

(75) Inventors: Motonori Usui, Nagano (JP);
Toshimasa Kobayashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 269 days.

(21) Appl. No.: 10/200,046

(22) Filed: Jul. 18, 2002

(65) Prior Publication Data

US 2003/0019754 A1 Jan. 30, 2003

(30) Foreign Application Priority Data

Jul. 27, 2001 (JP) ........................................ 2001-228595
Jul. 27, 2001 (JP) ........................................ 2001-228632

(51) Int. Cl.$^7$ ......................... B23H 3/00; C25D 17/00; F16C 32/06
(52) U.S. Cl. ................. 206/666; 205/668; 204/224 M; 384/114
(58) Field of Search .................... 204/224 M; 205/674, 205/684, 671, 666, 668; 384/114

(56) References Cited

U.S. PATENT DOCUMENTS

| | | | | | |
|---|---|---|---|---|---|
| 4,386,256 A | * | 5/1983 | Inoue | ...................... | 219/69.17 |
| 4,549,944 A | * | 10/1985 | Pliefke | ...................... | 205/656 |
| 6,544,403 B2 | * | 4/2003 | Usui | ......................... | 205/666 |

* cited by examiner

Primary Examiner—Gregg Cantelmo
Assistant Examiner—Thomas H. Parsons
(74) Attorney, Agent, or Firm—Hogan & Hartson, LLP

(57) ABSTRACT

An electrolytic machining method for electrolytically machining a workpiece is provided. The method uses a masking member having through-hole patterns that correspond to the shapes of concave parts to be formed in the workpiece. The masking member is brought in contact with a machining surface of the workpiece. An electrolytic solution is supplied and allowed to flow in the gap between the masking member and an electrode tool. The electrolytic solution is allowed to enter into and flow within the through-hole patterns of the masking member in order to electrolytically machine surfaces of the workpiece only in the through-hole patterns.

17 Claims, 11 Drawing Sheets

ELECTROLYTIC MACHINING METHOD, METHOD FOR MANUFACTURING DYNAMIC PRESSURE BEARING DEVICES, AND DYNAMIC PRESSURE BEARING DEVICES MANUFACTURED ACCORDING TO THE MANUFACTURING METHOD

FIELD OF THE INVENTION

The present invention relates to an electrolytic machining method, in which an electrolytic machining is performed on a workpiece that is positioned opposite to an electrode tool by filling an electrolytic solution between the workpiece and the electrode tool and applying a current across the workpiece and the electrode tool, a method for fabricating grooves for dynamic pressure bearings, and dynamic pressure bearing devices manufactured according to the manufacturing method.

DESCRIPTION OF RELATED ART

An electrolytic machining is conducted by concentrating electrolytic dissolution on designated parts of a workpiece, and an electrolytic machining device such as the one shown in FIG. 15 has been known for some time. In the electrolytic machining device shown in FIG. 15, a workpiece 4 is placed on a jig 3, which is mounted on a base 1 via an insulating material 2, and an electrode tool 5 is placed opposite to the workpiece 4 in close proximity. The workpiece 4 is connected to the positive side (+ pole) of a power supply for electrolytic machining, which is omitted from drawings, while the electrode tool 5 is connected to the negative side (– pole).

In the meantime, an electrolytic solution 6 is supplied into a gap between the electrode tool 5 and the workpiece 4 by a pump 7, which is a device for supplying the electrolytic solution, via a filter 8. As the electrolytic solution 6 flows between the electrode tool 5 and the workpiece 4, a current is applied across the electrode tool 5 and the workpiece 4. As a result of this, the workpiece 4 dissolves electrochemically and the electrolytic machining of the workpiece 4 takes place.

A feeder 10 is installed on the electrode tool 5. The electrode tool 5 is fed by the feeder 10 into the workpiece 4 as the machining on the workpiece 4 progresses, and this allows a predetermined machining gap (equilibrium gap) between the two to be maintained, which consequently allows a shape that is an inversion of the shape of the electrode tool 5 to be formed on the workpiece 4. The gas that is generated by the electrolytic machining is ventilated outside by a fan 11. In addition, the electrolytic solution whose temperature rises due to the Joule heat contains various types of electrolytic products; a used electrolytic solution 12 is purified by a centrifuge 13 and subsequently supplied between the electrode tool 5 and the workpiece 4 again.

However, a mass production machining process using such a general electrolytic machining method entails the following problems:

(1) There is a tendency for machining widths of workpieces to be larger than the widths of electrode tools, and fluctuations in the machining widths tend to occur.

(2) When the gap between the electrode tool and the workpiece is narrowed in order to reduce the fluctuations in machining widths, various types of particles in the electrolytic solution such as electrolytic products from the workpieces tend to cause clogging, which often leads to defective machining.

(3) Similarly, when the gap between the electrode tool and the workpiece is narrowed, the flow of the electrolytic solution is less smooth, and this tends to cause deterioration in the electrolytic solution during machining, deeper machining on the side the electrolytic solution enters, and gradually shallower machining depth towards the side the electrolytic solution leaves.

When the electrolytic machining is used to machine dynamic pressure generating grooves for dynamic pressure bearing devices that utilize the dynamic pressure of lubricating fluid, the shapes of dynamic pressure generating grooves, which have a major impact on the dynamic pressure property, cannot be obtained with the required precision; consequently, desirable dynamic pressure property cannot be obtained and productivity falls. Further, if electrolytic products and/or electrolytic solution remain attached to a machined product, the machined product can become chemically tainted and therefore unusable depending on the type of device the machined product is used on, such as a type of rotating body supported by a dynamic pressure bearing device, e.g., a hard disk drive (HDD).

SUMMARY OF THE INVENTION

In view of the above, the present invention provides an electrolytic machining method, a method for forming grooves in workpieces, a method for fabricating dynamic pressure bearing grooves, with a simple structure and in which workpieces can be machined with high precision and efficiency.

In an electrolytic machining method in accordance with an embodiment of the present invention, a masking member may be brought in contact with a machining surface of a workpiece, wherein the masking member has through-hole patterns that correspond to the shapes of concave parts, e.g., grooves, to be formed in the workpiece. An electrolytic solution is supplied and allowed to flow in the gap between the masking member and an electrode tool, and the electrolytic solution is allowed to enter into and flow within the through-hole patterns of the masking member in order to allow the electrolytic machining to take place only in the through-hole patterns. The electrode tool may be brought in contact with and pressed against the masking member, or may be spaced a specified distance from the masking member.

In the electrolytic machining method described above, the electrolytic solution supplied to the workpiece flows only within the hole patterns of the masking member that contacts the workpiece, so that even if the fluidity of the electrolytic solution is enhanced by enlarging the gap between the workpiece and the electrode tool or by making the thickness of the masking member thicker, concave parts in shapes corresponding to the hole patterns of the masking member are formed with high precision on the workpiece.

In the electrolytic machining method described above, an insulating material may be provided on at least the surface part of the masking member. As a result, the current to parts of the workpiece other than the hole patterns of the masking member can be nearly completely shut out, which further contributes to the high precision of the shapes of the concave parts formed.

Further, when a mixed solution that includes a surface-active agent is used as the electrolytic solution, a smooth flow of the electrolytic solution is ensured since various types of particles such as electrolytic products that are dissolved from the workpiece become absorbed by the surface-active agent in the electrolytic solution.

In addition, an ultrasonic vibration generating device may be provided for applying ultrasonic vibration to the electrolytic solution. Various types of particles such as electrolytic products that are dissolved from the workpiece flow smoothly due to the ultrasonic vibration applied to the electrolytic solution.

Moreover, the currents for the electrolytic machining and for ultrasonic vibration may be applied independently of each other. In one embodiment, the currents for the electrolytic machining and for the ultrasonic vibration can be applied alternately, or the currents for the electrolytic machining and the ultrasonic vibration may be applied in a manner at least partially overlapped one another. As a result, the best machining condition can be obtained at all times by appropriately switching between the current application for the electrolytic machining and the current application for ultrasonic vibration depending on the status of the electrolytic machining.

In a method for manufacturing a dynamic pressure bearing device in accordance with an embodiment of the present invention, a masking member having continuous throughhole patterns that correspond to the shapes of dynamic pressure generating grooves, may be brought in contact with a machining surface of a workpiece; an electrolytic solution is supplied and allowed to flow in the gap between the masking member and an electrode tool; and the electrolytic solution is allowed to enter into and flow within the hole patterns of the masking member in order to allow the electrolytic machining to take place.

In such a manufacturing method for a dynamic pressure bearing device, the electrolytic solution supplied to the workpiece is allowed to flow only within the hole patterns of the masking member adhered to the workpiece, so that even if the fluidity of the electrolytic solution is enhanced by enlarging the gap between the workpiece and the electrode tool, dynamic pressure generating grooves in shapes corresponding to the hole patterns of the masking member are formed with high precision in the workpiece.

Further, the dynamic pressure bearing device according to the present invention is manufactured with high precision and efficiency, due to the fact that it is equipped with a shaft member or a bearing member manufactured according to the manufacturing method for the dynamic pressure bearing device described above.

Other features and advantages of the invention will be apparent from the following detailed description, taken in conjunction with the accompanying drawings that illustrate, by way of example, various features of embodiments of the invention.

DESCRIPTION OF PREFERRED EMBODIMENT

An embodiment of the present invention is described in detail below with reference to the accompanying drawings. First, an overall structure of a hard disk drive device (HDD) is described below as an example to which the manufacturing method according to the present invention is applied.

Figure 7:
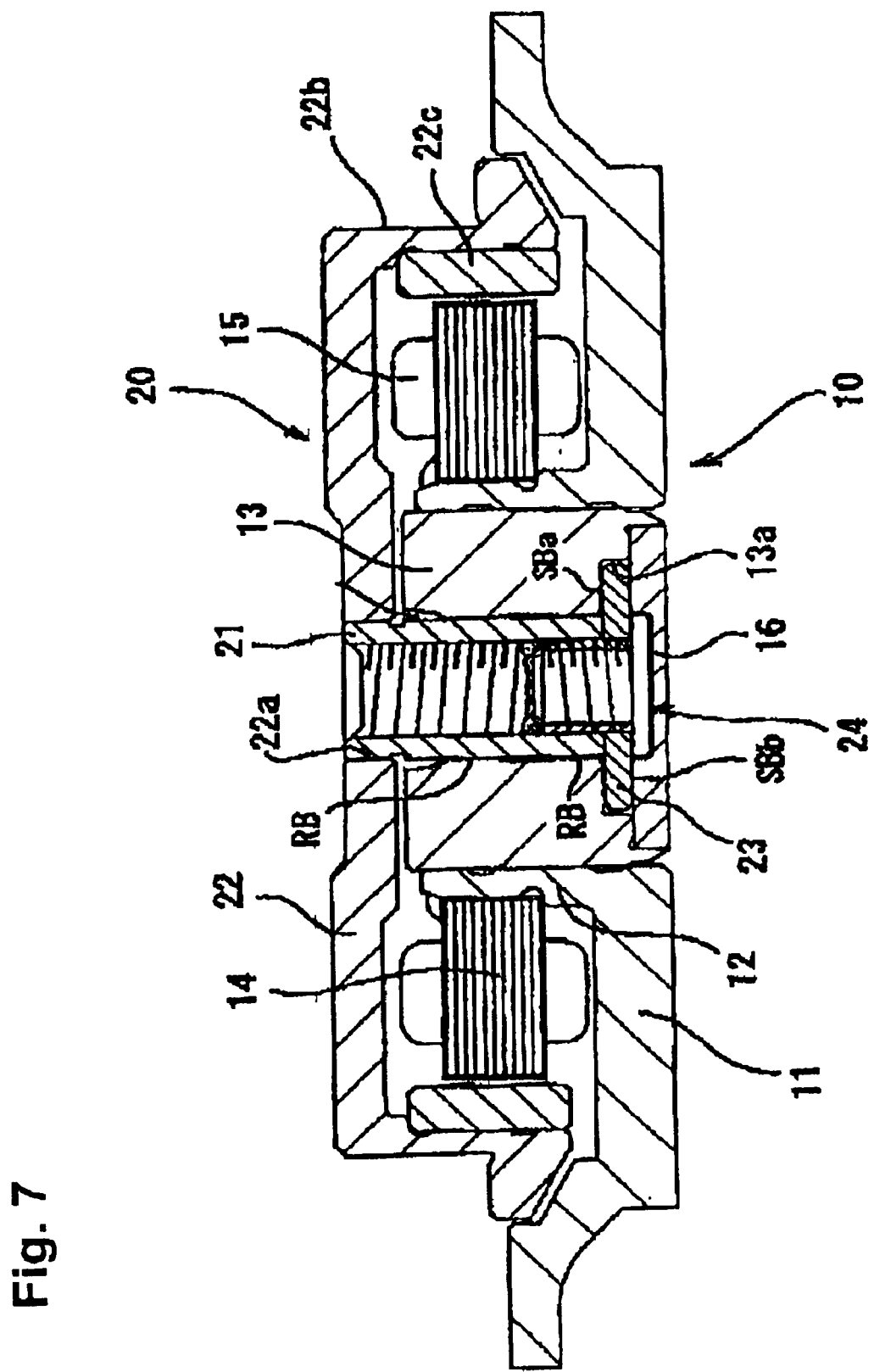
FIG. 7 is a longitudinal cross-sectional view illustrating an example of the structure of a hard disk drive (HDD) motor as an example of a device with a dynamic pressure bearing device manufactured through electrolytic machining according to the present invention.

The overall view of an entire HDD spindle motor on shaft rotation shown in FIG. 7 comprises a stator assembly 10, which is a fixed member, and a rotor assembly 20, which is a rotating member assembled onto the top of the stator assembly 10. The stator assembly 10 has a fixed frame 11, which is screwed to a fixed base omitted from drawings. The fixed frame 11 is formed with an aluminum material to achieve a lighter weight; on the inner circumference surface of a ring-shaped bearing holder 12 formed upright in the generally center part of the fixed frame 11 is a bearing sleeve 13, which is a fixed bearing member formed in the shape of a hollow cylinder and joined to the bearing holder 12 through a press fit or a shrink fit. The bearing sleeve 13 is formed with a copper material such as phosphor bronze in order to more easily machine holes with small diameters.

A stator core 14, which comprises a laminate of electromagnetic steel plates, is mounted on the outer circumference mounting surface of the bearing holder 12. A drive coil 15 is wound around each of the salient pole sections provided on the stator core 14.

A rotary shaft 21 that comprises the rotor assembly 20 is inserted in a freely rotatable manner in a center hole provided in the bearing sleeve 13. This means that a dynamic pressure surface formed on an outer circumference surface of the rotary shaft 21 and a dynamic pressure surface formed on an inner circumference wall section of the bearing sleeve 13 are positioned opposite of each other in a radial direction and in close proximity, and a radial dynamic pressure bearing section RB is formed in the minuscule gap section between them. More specifically, the dynamic pressure surface on the bearing sleeve 13 side and the dynamic pressure surface on the rotary shaft 21 side of the radial dynamic pressure bearing section RB are positioned opposite each other in a circular fashion across a minuscule gap of several $\mu$m, and a lubricating fluid such as a lubricating oil is poured or filled in a continuous manner in an axial direction in the bearing space formed by the minuscule gap.

On at least one of the dynamic pressure surfaces of the bearing sleeve 13 or the rotary shaft 21 are radial dynamic pressure generating grooves in a herringbone shape, for example, that are omitted from drawings but concavely formed in a ring shape in two blocks separated in the axial direction. During rotation, a pumping effect of the radial dynamic pressure generating grooves pressurizes the lubricating fluid to generate dynamic pressure, and a rotary hub 22, which is described later, together with the rotary shaft 21 becomes shaft-supported in a non-contact state with respect to the bearing sleeve 13 due to the dynamic pressure of the lubricating fluid.

The rotary hub 22 that together with the rotary shaft 21 comprises the rotor assembly 20 is a generally cup-shaped member made of an aluminum metal, and a joining hole 22a provided in the center part of the rotary hub 22 is joined in a unitary fashion with the top end part of the rotary shaft 21 through a press fit or a shrink fit. A memory medium such as a magnetic disk is fixed to the rotary hub 22 with a clamper, which is omitted from drawings. The rotary hub 22 has a generally cylindrical-shaped body section 22b, which has a memory medium disk mounted on its outer circumference section, and a ring-shaped drive magnet 22c towards the bottom on the inner circumference wall surface of the body section 22b. The ring-shaped drive magnet 22c is positioned in a ring-shaped manner in close proximity to and opposite of the outer circumference end surface of the stator core 14.

In the meantime, a disk-shaped thrust plate 23 is fixed by a plate fixing screw 24 at the bottom end part of the rotary shaft 21. The thrust plate 23 is positioned to be contained within a cylindrically shaped depressed section 13a, which is concavely formed in the center part of the bearing sleeve 13 towards the bottom, and a dynamic pressure surface on the top surface of the thrust plate 23 is positioned opposite a dynamic pressure surface of the bearing sleeve 13 in close proximity to each other in the axial direction.

Figure 8:
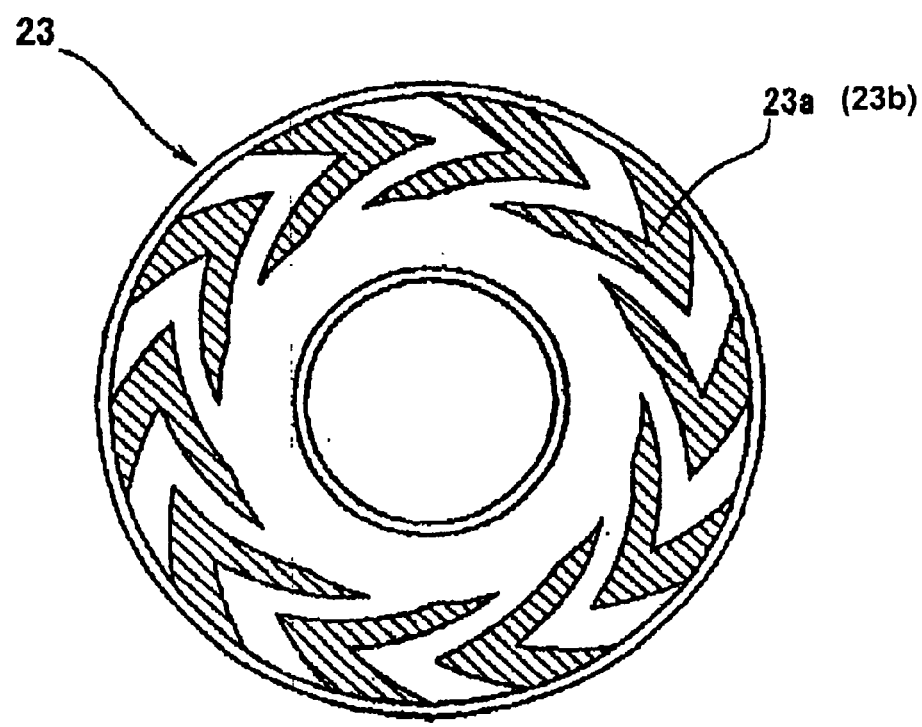
FIG. 8 is a plan view illustrating an example of the structure of a thrust plate used in the dynamic pressure bearing device shown in FIG. 7.
Figure 9:
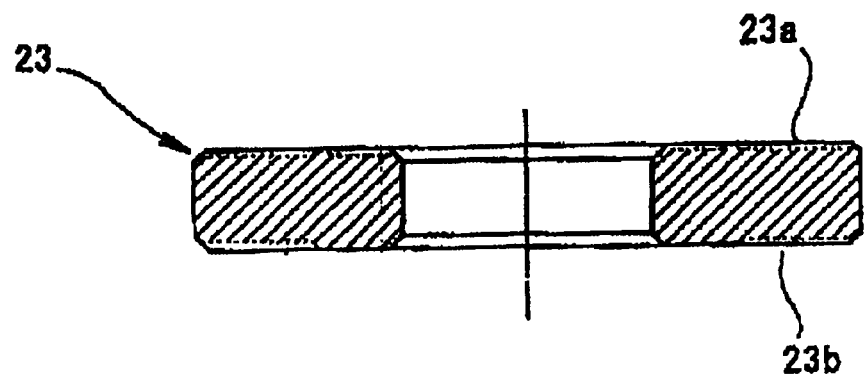
FIG. 9 is a longitudinal cross-sectional view illustrating the thrust plate shown in FIG. 8.
Figure 10:
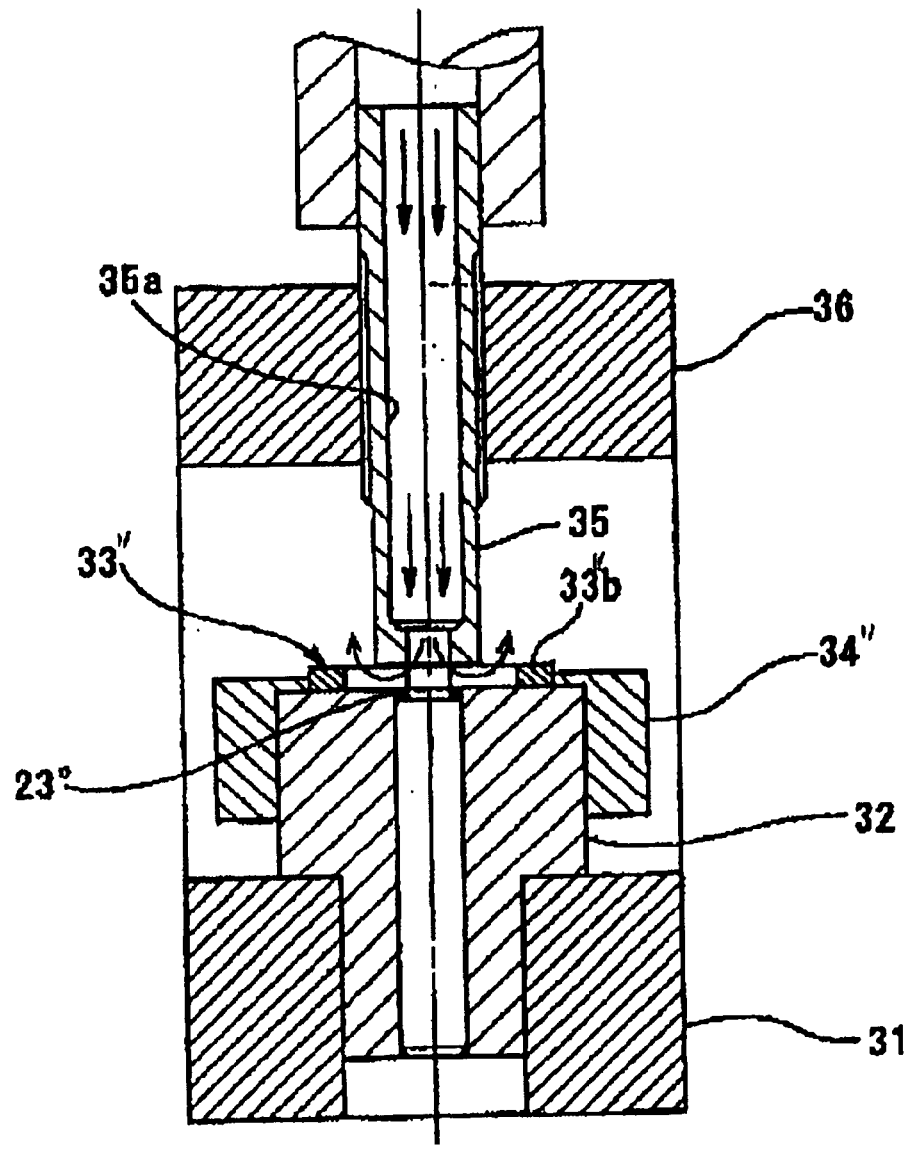
FIG. 10 is a front cross-sectional view illustrating another example of an electrolytic machining device to implement the present invention.
Figure 11:
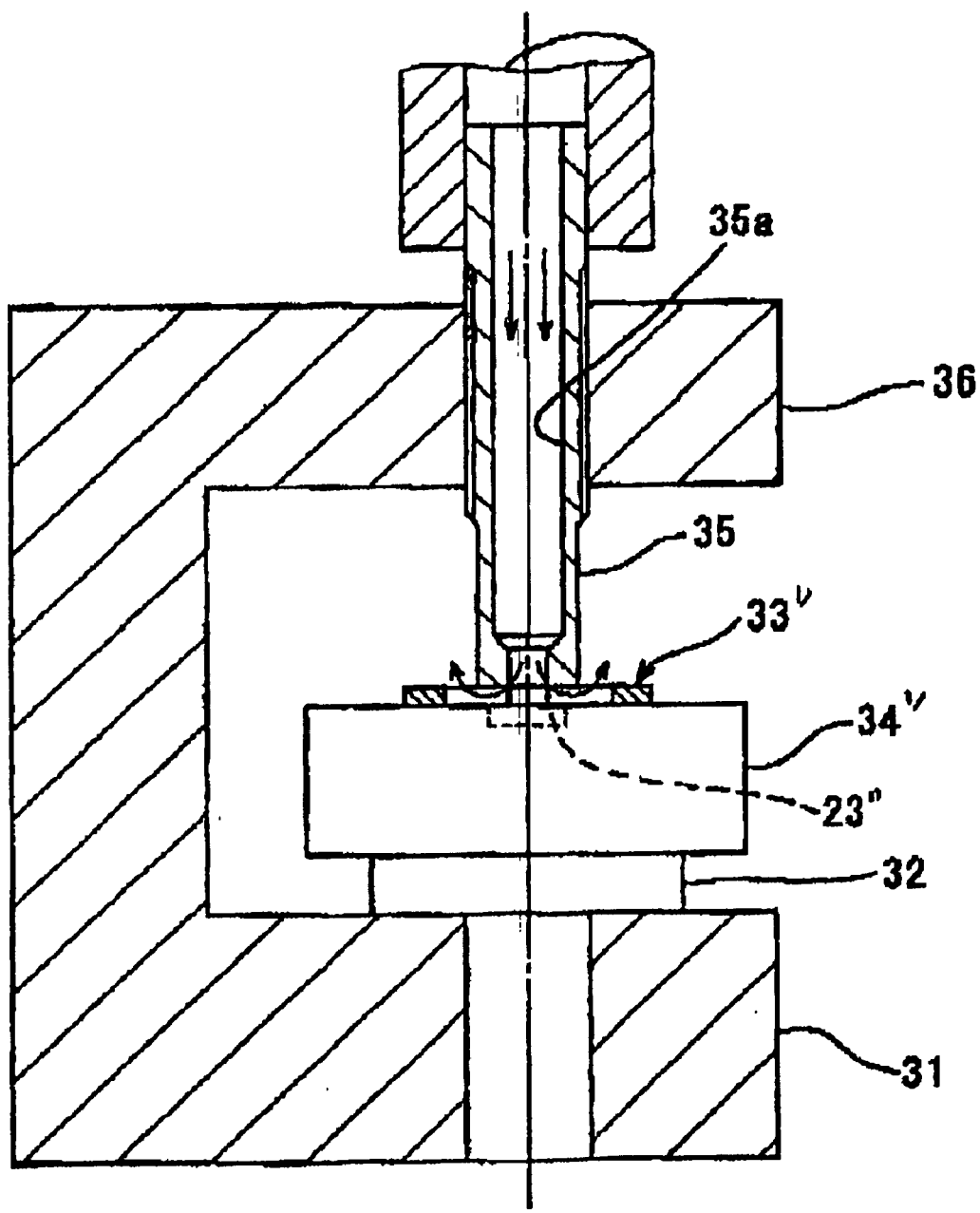
FIG. 11 is a side cross-sectional view illustrating a summary structure of the electrolytic machining device to implement the present invention shown in FIG. 10.

On the dynamic pressure surface on the top surface of thrust plate 23 are formed thrust dynamic pressure generating grooves 23a in herringbone shapes as shown in FIG. 8 through an electrolytic machining method described later, and a top thrust dynamic pressure bearing section SBa is formed in the gap part between the opposing dynamic pressure surfaces of the thrust plate 23 and the bearing sleeve 13.

A counter plate 16, which is a disk-shaped member with a relatively large diameter, is positioned in close proximity to a dynamic pressure surface on the bottom surface of the thrust plate 23. The counter plate 16 is positioned to close off the opening part at the bottom of the bearing sleeve 13, and the outer circumference part of the counter plate 16 is fixed to the bearing sleeve 13.

Herringbone-shaped thrust dynamic pressure generating grooves 23b are formed on a dynamic pressure surface on the bottom surface of the thrust plate 23 through the electrolytic machining method described later, and a bottom thrust dynamic pressure bearing section SBb is thereby formed.

The two dynamic pressure surfaces of the thrust plate 23 and the respective opposing dynamic pressure surface of the bearing sleeve 13 and of the counter plate 16 thus form a set of thrust dynamic pressure bearing sections SBa and SBb that are positioned adjacent to each other in the axial direction; each opposing set of dynamic pressure surfaces are positioned opposite of each other in the axial direction across a minuscule gap of several $\mu$m. The lubricating fluid such as oil is poured or filled in the bearing spaces consisting of the minuscule gaps in a continuous manner in the axial direction through a pathway on the outer circumference of the thrust plate 23. During rotation, a pumping effect caused by the thrust dynamic pressure generating grooves 23a and 23b provided on the thrust plate 23 pressurizes the lubricating fluid to generate dynamic pressure; and the dynamic pressure of the lubricating fluid causes the rotary shaft 21 and the rotary hub 22 to be shaft-supported in the thrust direction in a floating, non-contact state with respect to the bearing sleeve 13.

Next, the structure of an electrolytic machining device that manufactures the thrust dynamic pressure generating grooves 23a and 23b on the thrust plate 23 in accordance with an embodiment of the present invention is explained.

As shown in FIGS. 1, 2, 3 and 4, the electrolytic machining device includes a main body base section 31, and a workpiece supporting jig 32 mounted on the main body base section 31. A concave section to mount a workpiece is provided in the generally center part of the workpiece supporting jig 32. A blank material (hereinafter called the thrust plate blank) 23' of the thrust plate 23, which is the workpiece, is horizontally held within the concave section for mounting a workpiece. A masking member 33, which is made of a thin plate insulating member, is mounted on the top surface of the thrust plate blank 23'.

The masking member 33 may be mounted in a manner to adhere to the thrust plate blank 23'. The masking member 33 is a disk-shaped member with a diameter larger than the outer diameter of the thrust plate blank 23', and the outer circumference rim section of the masking member 33 is pressed downward and fixed to the workpiece supporting jig 32 by a cap-shaped member 34.

Figure 1:
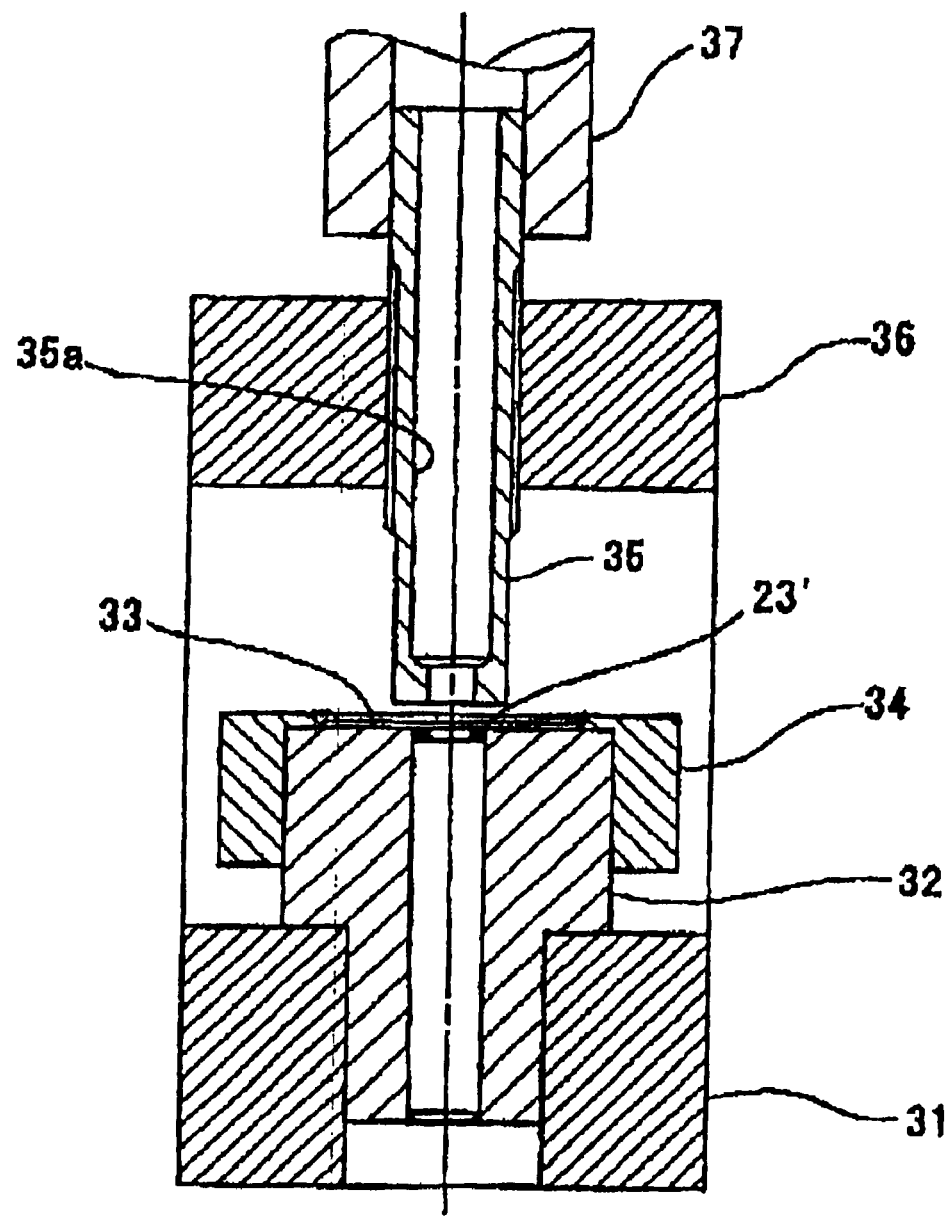
FIG. 1 is a front cross-sectional view illustrating a summary structure of an example of an electrolytic machining device used to implement the present invention.
Figure 2:
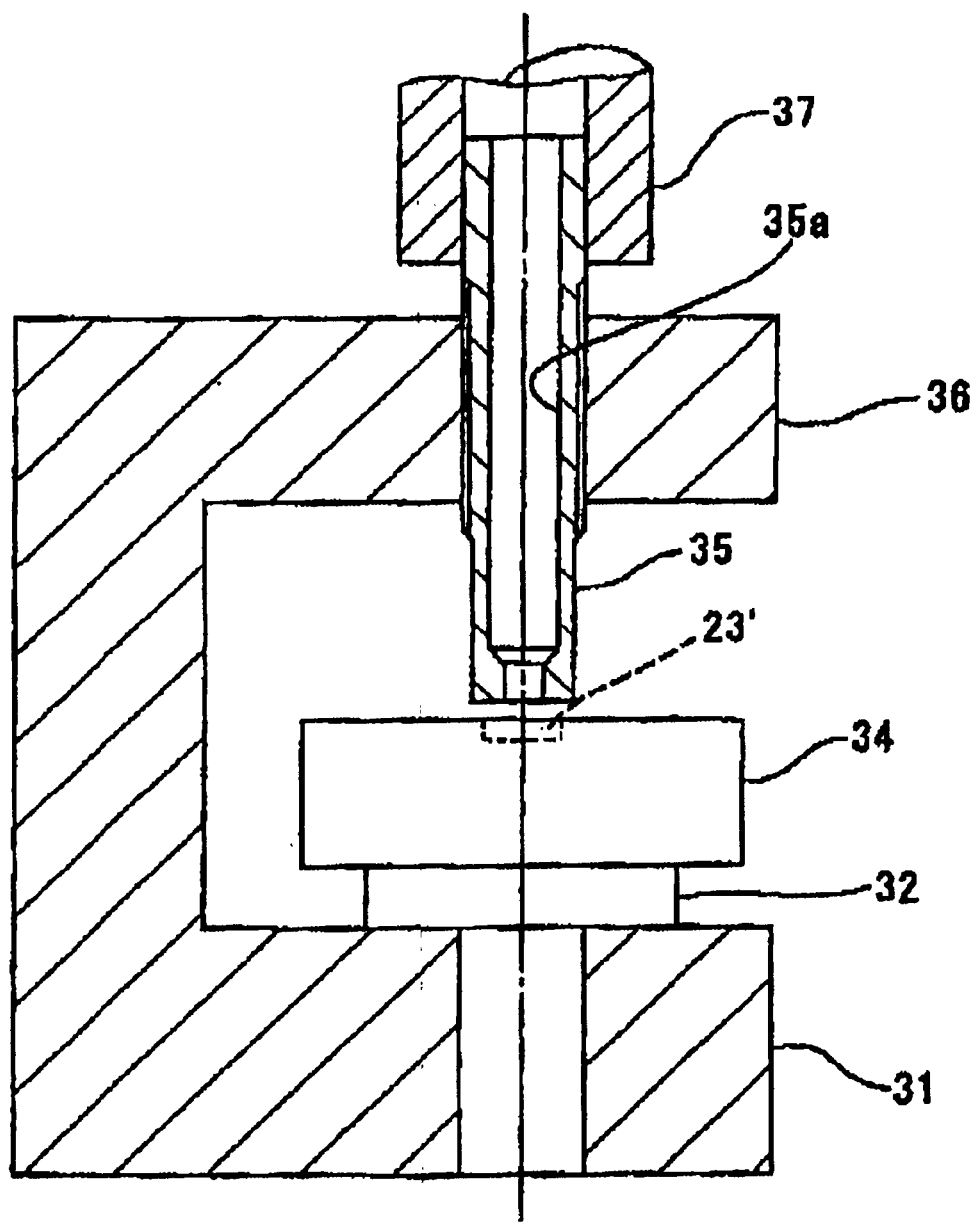
FIG. 2 is a side cross-sectional view illustrating the summary structure of the electrolytic machining device shown in FIG. 1 and used to implement the present invention.
Figure 3:
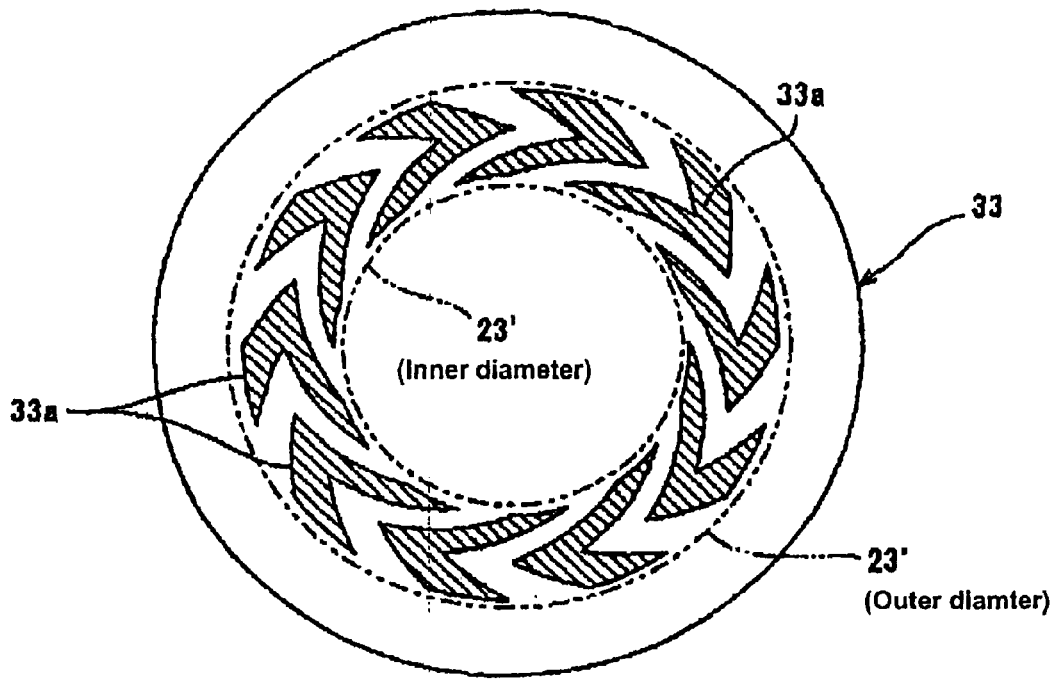
FIG. 3 is a plan view illustrating the structure of a masking member used in the electrolytic machining device shown in FIGS. 1 and 2.
Figure 4:
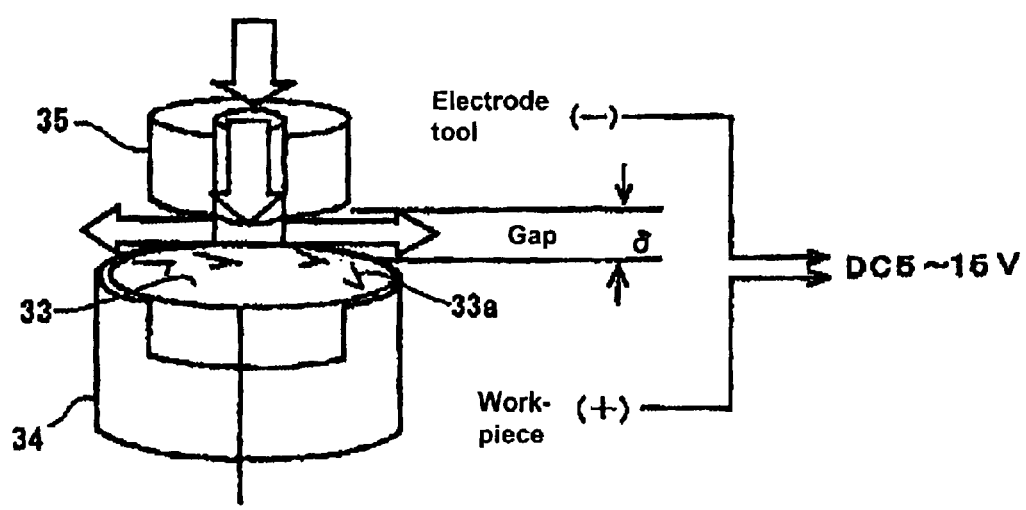
FIG. 4 is an exterior view illustrating key parts of the electrolytic machining device shown in FIGS. 1 through 3 in use.

In addition, hole patterns 33a that correspond to the thrust dynamic pressure generating grooves 23a and 23b define through-holes in the masking member 33, as shown in FIG. 3. The masking member 33 may have an insulating material to be formed on at least its surface part. A thin ceramic material or a stainless steel plate (SUS) on which an insulating material is electrodeposited or which is ceramic-coated, or a resin plate, can be used for the insulating material. The plate thickness of the masking member 33 may, for example, be approximately 0.05 mm–0.1 mm.

In the meantime, immediately above the thrust plate blank 23' and the masking member 33 is positioned upright in the generally vertical direction an electrode tool 35, which is a hollow rod-shaped member. The electrode tool 35 is fixed to or held in a vertically movable manner by a main body arm section 36 that extends upward from the main body base section 31, and the bottom end part of the electrode tool 35 is positioned to form a gap $\delta$ of approximately 1 mm, for example, with the masking member 33 during electrolytic machining. Furthermore, a negative pole (– pole) of a direct current power source with an output voltage of approximately 5V–15V, for example, is connected to the electrode tool 35, while a positive pole (+ pole) of the direct current power source is connected to the thrust plate blank 23', which is the workpiece.

Moreover, a fluid pathway 35a along the axial direction is formed as a through-hole in the center part of the electrode tool 35, and an electrolytic solution is supplied from the top end of the fluid pathway 35a by an electrolytic solution supply means (a pump), which is omitted from drawings. The electrolytic solution used can, for example, be a 10–30 wt. % $NaNo_3$ solution. The electrolytic solution supplied from the top of the electrode tool 35 passes through the fluid pathway 35a to the exit section provided at the bottom of the fluid pathway 35a and falls on the masking member 33 and the thrust plate blank 23'. The electrolytic solution supplied to the center section flows radially and is collected in a collection plate that is omitted from drawings. The electrolytic solution can also be a 3–10 wt. % KOH solution, a 3–10 wt. % NaOH solution, or a 5–15 wt. % $Na_2Co_3$ solution.

In this way, a current is applied across the electrode tool 35 and the thrust plate blank 23' while the electrolytic solution flows in the gap δ between the electrode tool 35 and both the masking member 33 and the thrust plate blank 23'. In this instance, because the hole patterns 33a that are provided in the masking member 33 are formed open to the electrolytic solution flow, the electrolytic solution flows into the interior of the hole patterns 33a. The electrolytic solution flows as it comes into contact with the surface parts of the thrust plate blank 23' which are exposed from the masking material 33. In other words, the electrolytic solution flows as it comes into contact with only the surface parts of the thrust plate blank 23' that corresponds to the hole patterns 33a. When the parts of the thrust plate blank 23' that come into contact with the electrolytic solution dissolve electrochemically, the electrolytic machining of the thrust plate blank 23' takes place.

A vibrator 37, for example an ultrasonic vibration generating device, is mounted on the electrode tool 35. In the present embodiment, the vibrator 37 is mounted at the very top end of the electrode tool 35. The vibrator 37 in the present embodiment is a horn type that amplifies the vibration width by about 20–22 μm, and ultrasonic vibration is provided to the electrolytic solution by vibrating the electrode tool 35.

Figure 5:
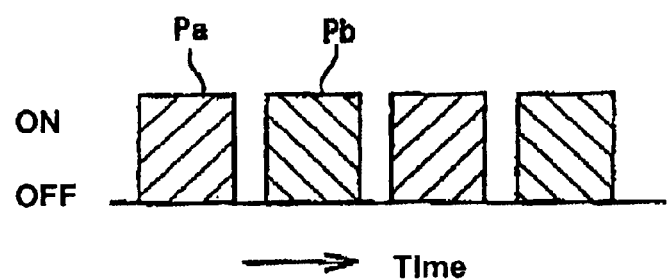
FIG. 5 is a drawing of an example of current applications to the electrolytic machining device shown in FIGS. 1 through 4.
Figure 6:
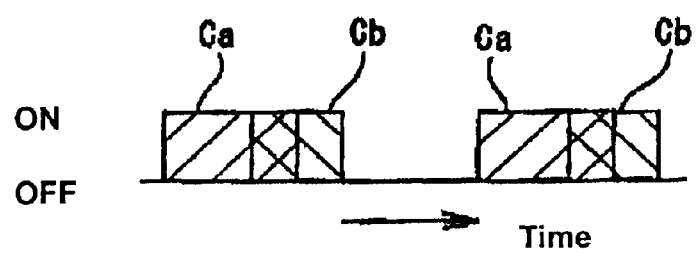
FIG. 6 is a drawing of another example of current applications to the electrolytic machining device shown in FIGS. 1 through 4.

In the present embodiment, the application of current for electrolytic machining and the application of current for ultrasonic vibration may be conducted independently of each other. In one embodiment, the application of currents can be conducted in a manner shown in FIG. 5, wherein a rectangular-shaped pulse current is used to alternate a current application Pa for electrolytic machining and an current application Pb for ultrasonic vibration. Alternatively, as shown in FIG. 6, a current application Ca with relatively long width for electrolytic machining and a current application Cb for ultrasonic vibration may partially overlap one another. In any of the methods, particles such as electrolytic products can be removed by the ultrasonic vibration as the electrolytic machining takes place.

The electrolytic solution used is a mixed solution that includes a surface-active agent. The surface-active agent in the present embodiment is one of the alkyl ether non-ionic activating agents whose amount added is 0.03% or more by volume. The reason for such an amount is based on the results of an experiment as shown in table 1.

Table 1 shows the number of residual metal chips contained in electrolytic solutions of varying concentration of the surface-active agent from 0% to 5%, after performing an electrolytic machining for 60 seconds with each concentration on a workpiece made of a stainless steel material (SUS 420) with an inner diameter of 5.0 mm and thickness of 12 mm.

TABLE 1

| Number of Residual Metal Chips after Machining SUS 420 Material | | | | | | |
|---|---|---|---|---|---|---|
| Concentration/ Processing Time | 0% 60 sec. | 0.03% 60 sec. | 0.05% 60 sec. | 1% 60 sec. | 2% 60 sec. | 5% 60 sec. |
| Average | 15,426 | 552 | 276 | 0.01 | 0 | 0 |
| Maximum | 24,573 | 891 | 828 | 2 | 0 | 0 |

From table 1, we can see that when the concentration of the surface-active agent is 0.03% or more by volume, the number of residual metal chips is drastically reduced compared to when the concentration of the surface-active agent is 0% by volume, and that the surface-active agent is working efficiently. Further, when the concentration is 2% by volume, the number of residual metal chips is virtually zero. This property remains unchanged even when the concentration of the surface-active agent is 5% or more by volume. Accordingly, the concentration of the surface-active agent may preferably be set at around 2% by volume.

In the method for manufacturing a dynamic pressure bearing device having such a structure, the electrolytic solution provided to the thrust plate blank 23', which is the workpiece, flows only into the hole patterns 33a of the masking member 33 that adheres to the thrust plate blank 23'. Consequently, even if the gap between the electrode tool 35 and both the masking member 33 and the thrust plate blank 23' is enlarged to increase the fluidity of the electrolytic solution, the dynamic pressure generating grooves 23a and 23b, whose shapes correspond to the hole patterns 33a of the masking member 33, are still formed with high precision in the thrust plate blank 23'.

In addition, in the method for manufacturing the dynamic pressure bearing device according to the present embodiment, due to the fact that the masking member 33 is formed with an insulating material, the current to parts of the masking member 33 other than those inside the hole patterns 33a is nearly completely shut off, which contributes to an even higher precision in the shapes of the dynamic pressure generating grooves 23a and 23b.

Furthermore, in the method for manufacturing the dynamic pressure bearing device according to the present embodiment, due to the fact that a mixed solution that includes a surface-active agent is used as the electrolytic solution, various particles such as electrolytic products from the thrust plate blank 23', which is a workpiece, are absorbed by the surface-active agent in the electrolytic solution, which ensures a smooth flow of the electrolytic solution.

Moreover, in the method for manufacturing the dynamic pressure bearing device according to the present embodiment, due to the fact that the vibrator 37, which is the ultrasonic vibration generating device that provides ultrasonic vibration to the electrolytic solution, is provided, various particles such as electrolytic products that are dissolved from the workpiece are allowed to flow smoothly due to the ultrasonic vibration provided to the electrolytic solution.

In the meantime, in the method for manufacturing the dynamic pressure bearing device according to the present embodiment, due to the fact that the currents for the electrolytic machining and the ultrasonic vibration are applied independently of each other, and the current application Pa (or Ca) for electrolytic machining and the current application Pb (or Cb) for ultrasonic vibration are conducted alternately (or at least partially overlapped), the best machining condition can be obtained at all times by appropriately switching between the current application for electrolytic machining and the current application for ultrasonic vibration depending on the status of the electrolytic machining.

Next, another embodiment of the present invention will be explained based on FIGS. 10, 11, 12, 13 and 14. Elements that are identical to elements in the embodiment already described are assigned the same numbers and their descriptions are omitted.

As shown in FIGS. 10, 11, 12, 13 and 14, the electrolytic machining device includes a main body base section 31, and a workpiece support jig 32 mounted on the main body base section 31. A blank material (hereinafter called the thrust plate blank) 23" of the thrust plate 23, which is a workpiece, is held in the generally center part of the workpiece support jig 32.

On the top surface of the thrust plate blank 23" is a masking member 33", which is made of an insulating member and mounted to adhere to the thrust plate blank 23". The masking member 33" is a relatively thick plate-shaped member with a diameter larger than the outer diameter of the thrust plate blank 23", and the outer circumference rim section of the masking member 33" is fixed to the workpiece supporting jig 32 by a cap-shaped member 34".

Figure 12:
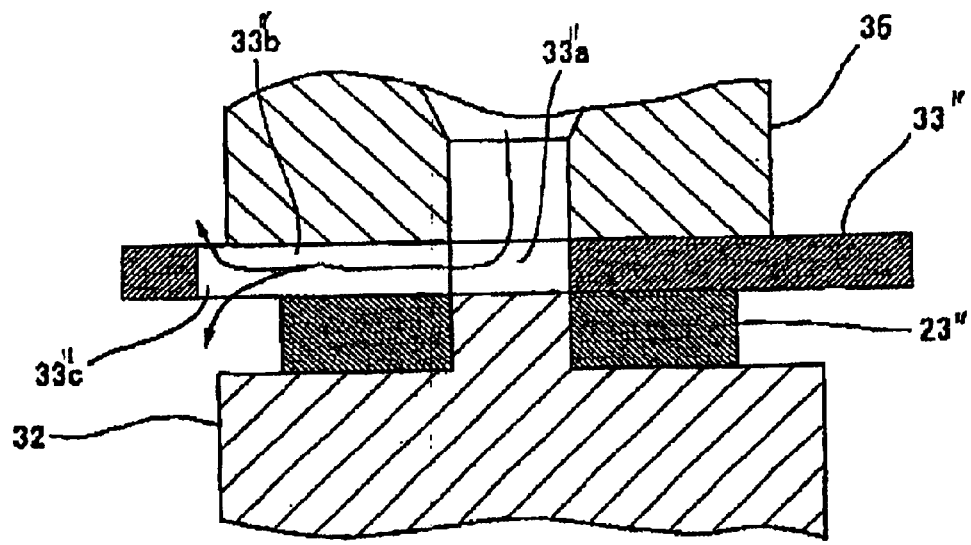
FIG. 12 is an enlarged view of key parts of FIG. 11, which is a cross-sectional view taken along a line III—III in FIG. 13.
Figure 13:
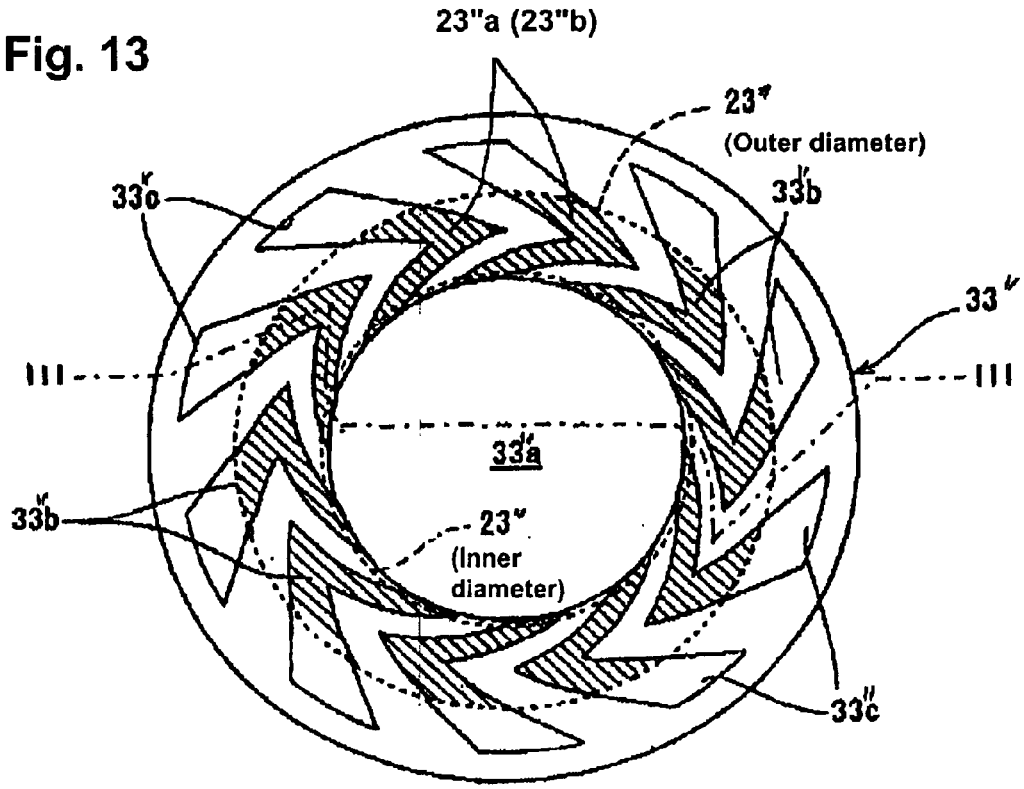
FIG. 13 is a plan view illustrating the structure of a masking member used in the electrolytic machining device shown in FIG. 10.
Figure 14:
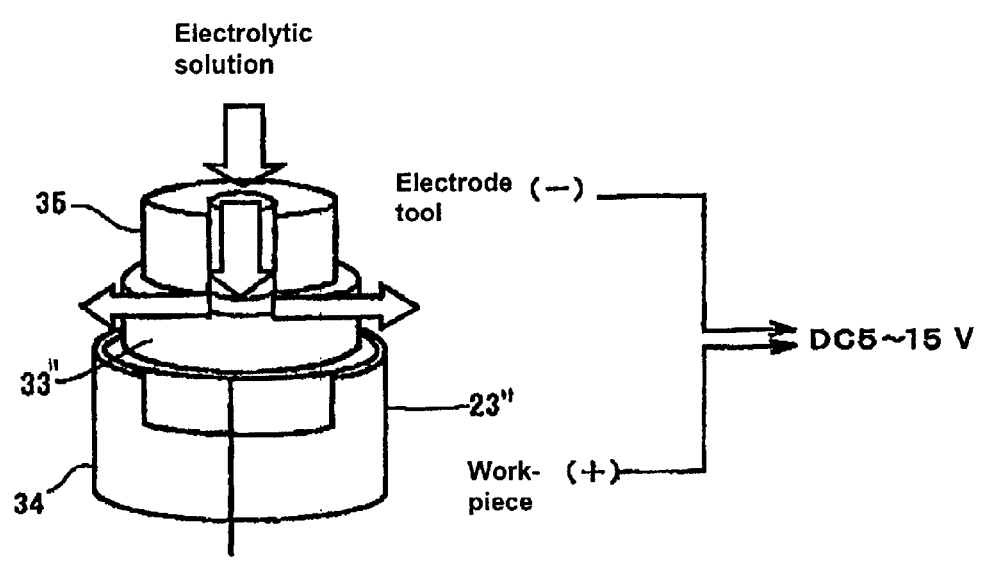
FIG. 14 is an exterior view of key parts of the electrolytic machining device shown in FIG. 10 in use.

As shown especially in FIGS. 12 and 13, at the center part of the masking member 33" is a supply opening 33"$a$, which receives an electrolytic solution described later and which is formed as a through-hole in the axial direction. Hole patterns 33"$b$ are formed to extend radially, outwardly from the supply opening 33"$a$ in the radial direction.

The hole patterns 33"$b$ include shapes corresponding to thrust dynamic pressure generating grooves 23"$a$ and 23"$b$. Each of the hole patterns 33"$b$ is formed as a through-hole in the axial direction and is also provided to extend further outward in the radial direction from the outer circumference rim section (indicated by a broken line in the drawing) of the thrust plate blank 23", the interior of which corresponds to the thrust dynamic pressure generating grooves 23"$a$ and 23"$b$ that are shaded in FIG. 13. The end part of each of the hole patterns 33"$b$ that extends outward in the radial direction forms a drain opening 33"$c$ that drains the electrolytic solution to the outside.

The masking member 33" needs an insulating material to be formed on at least its surface part, and a thin ceramic material or stainless steel plate (SUS) either electrodeposited or ceramic-coated, or a resin plate, is used for this purpose.

In the meantime, an electrode tool 35, which is a hollow rod-shaped member, is positioned immediately above and abutting to the masking member 33". The electrode tool 35 is fixed to a main body arm section 36 that extends upward from the main body base section 31, and the bottom end part of the electrode tool 35 is positioned to adhere to the top surface of the masking member 33" while pressing down on it in the axial direction.

A negative pole (− pole) of a direct current power source with an output voltage of approximately 5V–15V, for example, is connected to the electrode tool 35, while a positive pole (+ pole) of the direct current power source is connected to the thrust plate blank 23", which is the workpiece.

Moreover, in the center part of the electrode tool 35 is formed as a through-hole a fluid pathway 35$a$ along the axial direction, and the exit section at the bottom end of the fluid pathway 35$a$ opens into the supply opening 33"$a$ of the masking member 33", so that the two are made continuous. The electrolytic solution used can, for example, be a 30 wt. % $NaNo_3$ solution; the electrolytic solution supplied from the top end of the fluid pathway 35$a$ by an electrolytic solution supply device (a pump), which is omitted from drawings, is sent to the supply opening 33"$a$ of the masking member 33". The electrolytic solution can also be a 3–10 wt. % KOH solution, a 3–10 wt. % NaOH solution, or a 5–15 wt. % $Na_2Co_3$ solution.

The electrolytic solution supplied to the center part of the masking member 33" from the electrode tool 35 flows into the interiors of the hole patterns 33"$b$ provided in the masking member 33" and moves only outward in the radial direction as it comes into contact with the exposed surface parts of the thrust plate blank 23". When a current is applied across the electrode tool 35 and the thrust plate blank 23", the parts of the thrust plate blank 23" that come into contact with the electrolytic solution dissolve electrochemically and the electrolytic machining of the thrust plate blank 23" takes place.

Figure 15:
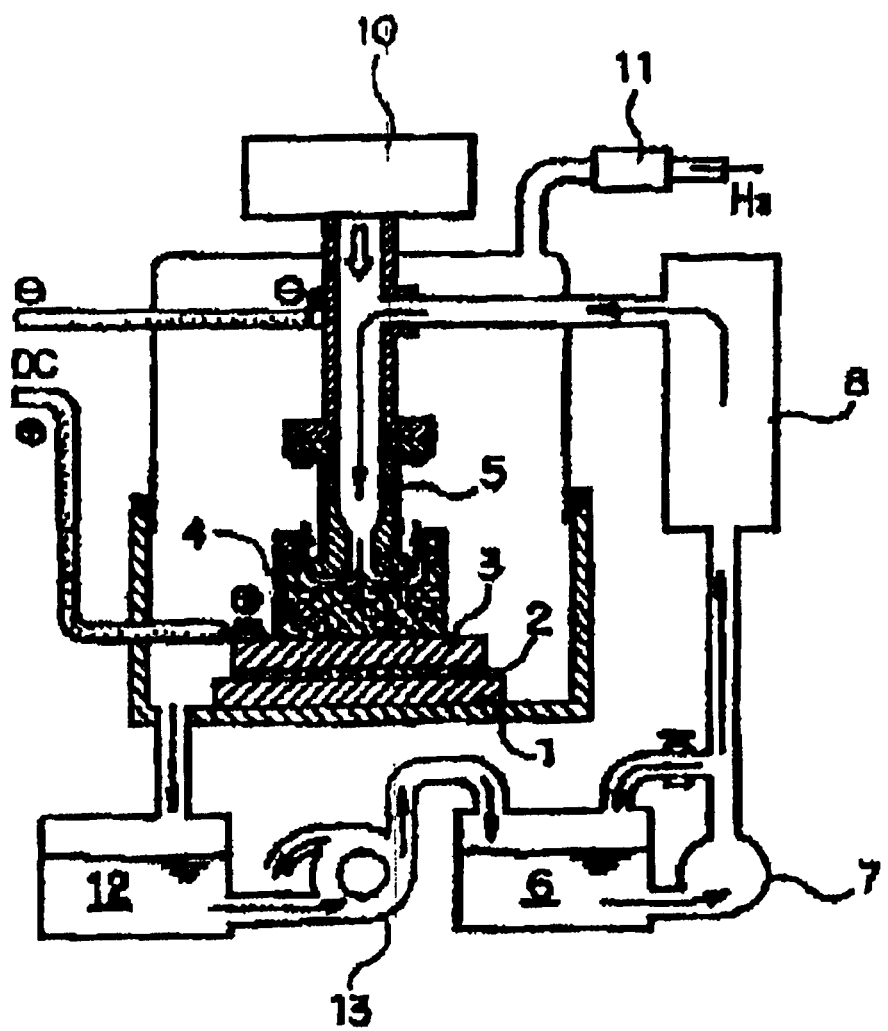
FIG. 15 is a side view schematically illustrating an example of summary structure of a general electrolytic machining device.

Each of the hole patterns 33"$b$ of the masking member 33" extends in the radial direction beyond the outer circumference rim section of the thrust plate blank 23", so that the electrolytic solution that flows within each of the hole patterns 33"$b$ outward in the radial direction beyond the outer circumference rim section of the thrust plate blank 23" is drained outside through the drain opening 33"$c$ provided at the outer most circumference part of each of the hole patterns 33". Thereafter, the drained electrolytic solution is collected in a collection plate omitted from drawings and re-circulated (see FIG. 15).

As in the previous embodiment, a mixed solution that includes a surface-active agent is used as the electrolytic solution in the present embodiment.

In the manufacturing method of a dynamic pressure bearing device having such a structure, the electrolytic solution supplied to the thrust plate blank 23", which is the workpiece, flows only into the hole pattern 33"$b$ of the masking member 33" that adheres to the thrust plate blank 23". Consequently, even if the thickness of the masking member 33" is made thicker to enlarge the gap between the thrust plate blank 23" and the electrode tool 35 to thereby increase the fluidity of the electrolytic solution, the dynamic pressure generating grooves 23"$a$ and 23"$b$, whose shapes correspond to the hole patterns 33"$b$ of the masking member 33", are still formed with high precision in the thrust plate blank 23".

Due to the fact that the hole patterns 33"$b$ of the masking member 33" extend outward in the radial direction beyond the outer circumference rim section of the thrust plate blank 23" and that the electrolytic solution is drained through the drain opening 33"$c$ provided at the outer extended end part of each of the hole patterns 33"$b$, the electrolytic solution supplied from the electrode tool 35 flows smoothly through the interiors of the hole patterns 33"$b$ of the masking member 33".

Although embodiments of the present invention by the inventors have been described in detail above, needless to say, many modifications can be made without departing from the present invention.

For example, in the embodiments described above the electrolytic solution flows only outward in the radial direction from the center, but the electrolytic solution can be made to flow only inward from outer parts towards the center or to flow alternately in both directions.

It is also possible to provide a supply opening for the electrolytic solution at the apex of the bend midway in the radial direction of each of the thrust dynamic pressure generating grooves 23a and 23b, and have the electrolytic solution branch off inward and outward and flow in both directions. In this case, drain openings for the electrolytic solution must be provided on both the inner circumference and outer circumference sides of the bearing.

Furthermore, the embodiments described above are applications of the present invention to dynamic pressure bearing devices for hard disk drive (HDD) motors, but the present invention is applicable to other dynamic pressure bearing devices, as well as to electrolytic machining methods for a wide variety of workpieces.

As described above, in an electrolytic machining method according to the present invention, a masking member having continuous through-holes patterns that correspond to the shapes of concave parts is adhered to a machining surface of a workpiece. An electrolytic solution is supplied and allowed to flow in the gap between the masking member and an electrode tool, and the electrolytic solution is allowed to enter into and flow within the hole patterns of the masking member in order to allow the electrolytic machining to take place. Since the electrolytic solution is allowed to flow only within the hole patterns of the masking member adhered to the workpiece, concave parts in shapes corresponding to the hole patterns of the masking member are formed easily and with high precision on the workpiece. Consequently, a high precision electrolytic machining can be done at low costs using a simple structure, which can significantly improve the practicality of electrolytic machining.

In the meantime, the manufacturing method for a dynamic pressure bearing device according to the present invention includes the steps of adhering a masking member having continuous through-hole patterns that correspond to the shapes of dynamic pressure generating grooves to a machining surface of a workpiece; supplying and allowing an electrolytic solution to flow in the gap between the masking member and an electrode tool; and allowing the electrolytic solution to enter into and flow within the hole patterns of the masking member in order to allow the electrolytic machining to take place. Since the electrolytic solution is allowed to flow only within the hole patterns of the masking member adhered to the workpiece, dynamic pressure generating grooves in shapes corresponding to the hole patterns of the masking member are formed easily and with high precision in the workpiece. Consequently, high precision dynamic pressure generating grooves can be made at low costs using a simple structure, which allows dynamic pressure bearing devices to be manufactured extremely favorably.

Further, the dynamic pressure bearing device according to the present invention can be manufactured efficiently, at low costs and with high precision, due to the fact that it is equipped with a shaft member or a bearing member manufactured according to the manufacturing method for the dynamic pressure bearing device according to the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electrolytic machining method for electrolytically machining a workpiece that is positioned opposite an electrode tool with an electrolytic solution filled between the electrode tool and the workpiece, the method comprising the steps of:

bringing a masking member in contact with a machining surface of a workpiece, the masking member being spaced a distance from the electrode tool, the masking member having through-hole patterns that corresponds in shape to concave parts to be formed in the workpiece;

supplying an electrolytic solution in a gap between the machining surface of the workpiece and the electrode tool; and flowing the electrolytic solution only within the through-hole patterns of the masking member and applying a current across the electrode tool and the workpiece.

2. An electrolytic machining method according to claim 1, wherein the masking member has a surface portion covered with an insulating material.

3. An electrolytic machining method according to claim 1, wherein the electrolytic solution is a mixed solution including a surface-active agent.

4. An electrolytic machining method according to claim 1, further comprising the step of applying ultrasonic vibration to the electrolytic solution.

5. An electrolytic machining method according to claim 4, wherein the step of applying a current across the electrode tool and the workpiece for electrolytic machining and the step of applying ultrasonic vibration to the electrolytic solution are conducted independently of each other.

6. An electrolytic machining, method according to claim 4, wherein the step of applying a current across the electrode tool and the workpiece for electrolytic machining and the step of applying ultrasonic vibration to the electrolytic solution are alternately conducted.

7. An electrolytic machining method according to claim 4, wherein the step of applying a current across the electrode tool and the workpiece for electrolytic machining and the step of applying ultrasonic vibration to the electrolytic solution are conducted at least partially overlapped one another.

8. A method for manufacturing a dynamic pressure bearing device including a dynamic pressure generation section having dynamic pressure generation grooves, the method comprising the steps of:

electrolytically machining a workpiece to form grooves for the dynamic pressure generation grooves in the workpiece, the workpiece being positioned opposite an electrode tool with an electrolytic solution filled between the electrode tool and the workpiece, wherein the step of electrolytically machining a workpiece comprises the steps of:

bringing a masking member in contact with a machining surface of a workpiece, the masking member being spaced a distance from the electrode tool, the masking member having through-hole patterns that corresponds in shape to concave parts to be formed in the workpiece;

supplying an electrolytic solution in a gap between the machining surface of the workpiece and the electrode tool; and flowing the electrolytic solution only within the through-hole patterns of the masking member and applying a current across the electrode tool and the workpiece.

9. A method for manufacturing a dynamic pressure bearing device according to claim 8, wherein the electrolytic solution is a mixed solution including a surface-active agent.

10. A method for manufacturing a dynamic pressure bearing device according to claim 8, further comprising the step of applying ultrasonic vibration to the electrolytic solution, wherein the step of applying a current across the electrode tool and the workpiece for electrolytic machining and the step of applying ultrasonic vibration to the electrolytic solution are conducted independently of each other.

11. A method for manufacturing a dynamic pressure bearing device according to claim 10, wherein the step of applying a current across the electrode tool and the workpiece for electrolytic machining and the step of applying ultrasonic vibration to the electrolytic solution are alternately conducted.

12. A method for manufacturing a dynamic pressure bearing device according to claim 10, wherein the step of applying a current across the electrode tool and the workpiece for electrolytic machining and the step of applying ultrasonic vibration to the electrolytic solution are conducted at least partially overlapped one another.

13. A dynamic pressure bearing device comprising at least one of a shaft member and a bearing member fabricated by the method for manufacturing a dynamic pressure bearing device according to claim 8.

14. An electrolytic machining method for electrolytically machining a workpiece that is positioned opposite an electrode tool with an electrolytic solution filled between the electrode tool and the workpiece, the method comprising the steps of:

bringing a masking member in contact with a machining surface of the workpiece, the masking member having through-hole patterns that corresponds in shape to concave parts to be formed on the machining surface in the workpiece;

bringing the electrode tool in which a liquid pathway is formed, in tight contact with the masking member with forming solution inlets and solution outlets in the through-hole patterns between the masking member and the electrode tool;

supplying an electrolytic solution into the solution inlets from the liquid pathway for making solution flows through gaps formed in the through-hole of the masking member to the solution outlets;

applying a current across the electrode tool and the workpiece; and discharging the electrolytic solution at outer ends of the solution outlets of the through-hole patterns.

15. An electrolytic machining method according to claim 14, wherein the solution outlets have extended sections that are continuously formed in the through-hole patterns and extended in a radial direction beyond an outer rim section of the workpiece, and the electrolytic solution is discharged at outer ends of the extended sections of the masking member.

16. A method for manufacturing a dynamic pressure bearing device having dynamic pressure generation grooves, by using an electrolytically machining of a workpiece to form grooves for the dynamic pressure generation grooves in the workpiece, the workpiece being positioned opposite an electrode tool with an electrolytic solution filled between the electrode tool and the workpiece, the method of the electrolytically machining comprising the steps of:

bringing a masking member in contact with a machining surface of the workpiece, the masking member having through-hole patterns that corresponds in shape to the dynamic pressure generation grooves to be formed on the machining surface in the workpiece;

bringing the electrode tool in which a liquid pathway is formed, in tight contact with the masking member with forming solution inlets and solution outlets in the through-hole patterns between the masking member and the electrode tool;

supplying an electrolytic solution into the solution inlets from the liquid pathway for making solution flows through gaps formed in the through-hole of the masking member to the solution outlets;

applying a current across the electrode tool and the workpiece; and discharging the electrolytic solution at outer ends of the solution outlets of the through-hole patterns.

17. A method for manufacturing a dynamic pressure bearing device according to claim 16, wherein the solution outlets have extended sections that are continuously formed in the through-hole patterns and extended in a radial direction beyond an outer rim section of the workpiece, and the electrolytic solution is discharged at outer ends of the extended sections of the masking member.

* * * * *